United States Patent
Gillen et al.

(10) Patent No.: US 11,445,625 B2
(45) Date of Patent: Sep. 13, 2022

(54) METHOD OF PREVENTING OR REDUCING WATER INGRESS INTO A TIRE INFLATION SYSTEM

(71) Applicant: Dana Heavy Vehicle Systems Group, LLC, Maumee, OH (US)

(72) Inventors: Kurt P. Gillen, Maumee, OH (US); Venkata Ramakanth Kona, Maumee, OH (US); Philip M. Molloy, Maumee, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 291 days.

(21) Appl. No.: 16/789,258

(22) Filed: Feb. 12, 2020

(65) Prior Publication Data

US 2020/0260600 A1    Aug. 13, 2020

Related U.S. Application Data

(60) Provisional application No. 62/804,280, filed on Feb. 12, 2019.

(51) Int. Cl.
| | |
|---|---|
| F16M 13/00 | (2006.01) |
| H05K 5/02 | (2006.01) |
| B60C 23/00 | (2006.01) |
| F16K 24/06 | (2006.01) |

(52) U.S. Cl.
CPC ......... *H05K 5/0213* (2013.01); *B60C 23/002* (2013.01); *F16K 24/06* (2013.01)

(58) Field of Classification Search
CPC ........................... H05K 5/0213; B60C 23/002
See application file for complete search history.

(56) References Cited

U.S. PATENT DOCUMENTS

| | | | | |
|---|---|---|---|---|
| 4,893,664 | A * | 1/1990 | Oltean | B60C 23/00363 152/416 |
| 2015/0258863 | A1* | 9/2015 | Gillen | B60C 23/00372 137/224 |
| 2017/0225535 | A1* | 8/2017 | Batsch | B60G 17/0195 |
| 2017/0368896 | A1* | 12/2017 | Balistreri | F16K 17/048 |

* cited by examiner

*Primary Examiner* — Amy J. Sterling
(74) *Attorney, Agent, or Firm* — McCoy Russell LLP

(57) ABSTRACT

A method and system of preventing or reducing water ingress into a tire inflation system is provided.

18 Claims, 2 Drawing Sheets

METHOD OF PREVENTING OR REDUCING WATER INGRESS INTO A TIRE INFLATION SYSTEM

CROSS REFERENCE TO RELATED APPLICATIONS

The present application claims priority to U.S. Provisional Application No. 62/804,280, titled "METHOD OF PREVENTING WATER INGRESS INTO A TIRE INFLATION SYSTEM", and filed on Feb. 12, 2019. The entire contents of the above-listed application are hereby incorporated by reference for all purposes.

BACKGROUND AND SUMMARY

The present application relates to a method of preventing or reducing water ingress into a tire inflation system. Tire inflation systems are utilized to adjust the tire pressure of one or more tires on a vehicle to provide the vehicle with versatility for differing terrain types or to reduce maintenance requirements. For example, a tire pressure can be decreased by a tire inflation system to provide additional traction for the vehicle and may be increased to reduce a rolling resistance of the vehicle. Further, utilizing a tire inflation system may eliminate the need to manually check the tire pressure of each tire and/or manually adjust the tire pressure when needed.

Modern tire inflation systems typically include a control unit. The control unit is provided to control the flow of air through the tire inflation system. The control unit may include a housing, which protects an electronic control portion, valves, and conduits. The control unit can be mounted on a vehicle in a location that exposes it to being submerged when the vehicle is fording a body of water such as, for example, a stream, river, or lake.

Exposure to water can damage the components of the tire inflation system located within the housing. The inventors herein have recognized the above issue as well as that it may be desirable to provide a method that prevents or reduces the chance or degree that the components of the control unit from being exposed to water when the vehicle is fording.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which.

DETAILED DESCRIPTION

Figure 1:
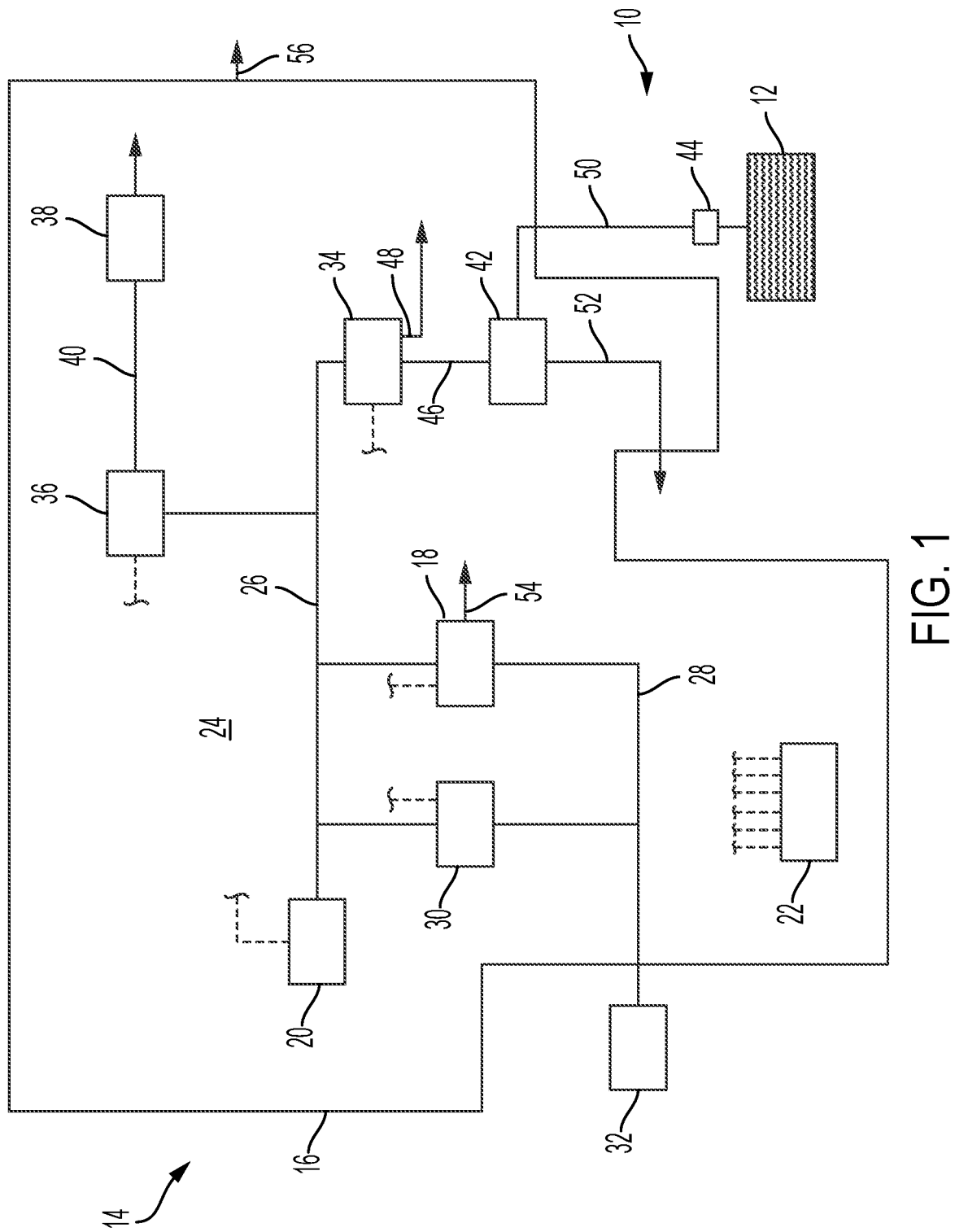
FIG. 1 is a schematic view of an embodiment of a tire inflation system in accordance with the application.

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application.

Referring now to FIG. 1, the method is utilized to prevent or reduce the ingress of water into a tire inflation system 10. Advantageously, the method can be utilized with existing tire inflation systems. Further, the method may have applications to commercial and off-highway vehicles. Also, it would be understood by one of ordinary skill in the art that the embodiments described herein could also have industrial, locomotive, military, and aerospace applications.

Preferably, the tire inflation system 10 is of the central tire inflation system (CTIS) variety. The tire inflation system 10 can be utilized to increase or decrease the tire pressure of a tire 12. As used herein, "tire pressure" refers to a pressure of air or another fluid contained within the tire. Although the tire inflation system is illustrated with only one tire 12 in FIG. 1, it should be appreciated that the tire inflation system 10 can be utilized to increase or decrease the tire pressure of a plurality of tires (not depicted), simultaneously or not.

The tire inflation system 10 comprises a control unit 14. The control unit 14 includes a housing 16. The housing 16 may be unitarily formed or comprise two or more separately formed portions. When the housing 16 is not unitarily formed, a seal may be provided between separately formed portions to help prevent water, dirt, and debris from entering the housing 16. The housing 16 is utilized to protect one or more valve assemblies 18, 30, 34, 36, 38, 42, a pressure transducer 20, and an electronic control portion 22 located therein. The housing 16 also defines a first cavity 24.

The one or more valve assemblies include a first valve assembly 18 (hereinafter referred to as "control valve assembly"). The control valve assembly 18 may be of the three-way variety. Also, it is preferred that the control valve assembly 18 is of the solenoid variety. However, it should be understood that the control valve assembly 18 may be another type of valve assembly. The control valve assembly 18 is in fluid communication with a first fluid conduit 26 (hereinafter referred to as "control conduit"). The control valve assembly 18 can be energized and placed in an energized position by the electronic control portion 22. In the energized position, the control valve assembly 18 facilitates fluid communication between the control conduit 26 and a second fluid conduit 28 (hereinafter referred to as "supply conduit").

The supply conduit 28 is in fluid communication with the control valve assembly 18 and a second valve assembly 30 (hereinafter referred to as "supply valve assembly"). The supply conduit 28 is also in fluid communication with a pressurized air supply 32. Preferably, the supply valve assembly 30 is of the solenoid variety. However, it should be appreciated that the supply valve assembly 30 may each be another type of valve assembly. The supply valve assembly 30 is in fluid communication with the pressurized air supply 32 and the control conduit 26. The pressurized air supply 32 may comprise an air compressor (not depicted) and other components known in the art and is preferably attached to the vehicle.

The control conduit 26 is attached to and in fluid communication with the control valve assembly 18, pressure transducer 20, supply valve assembly 3D, and another valve assembly 34 (hereinafter referred to as "channel valve assembly"). The control conduit 26 is also attached to and in fluid communication with a deflate valve assembly 36.

Preferably, the deflate valve assembly 36 is of the solenoid variety. However, it should be appreciated that the deflate valve assembly 36 may be of another type of valve assembly. The deflate valve assembly 36 is in fluid communication with the control conduit 26 and a pressure relief valve assembly 38. When energized and placed in an energized position by the electronic control portion 22, the deflate valve assembly 36 facilitates fluid communication between the control line 26 and the pressure relief valve assembly 38.

The pressure relief valve assembly 38 comprises a relief valve in communication with the deflate valve assembly 36 and the atmosphere. The pressure relief valve assembly 38 is configured to be placed in an open position when a pressure in a conduit 40 provided between the deflate valve assembly 36 and the pressure relief valve assembly 38 is greater than a predetermined pressure. When placed in the open position, the pressure relief valve assembly 38 facilitates fluid communication between the control line 26 and the atmosphere when the deflate valve assembly 36 is in the energized position.

Preferably, the channel valve assembly 34 is of the solenoid variety. Also, it is preferred that the channel valve assembly 34 is of the three-way variety. However, it should be understood that the channel valve assembly 34 may be another type of valve assembly.

The channel valve assembly 34 is in fluid communication with the control valve assembly 18, pressure transducer 20, supply valve assembly 30, and deflate valve assembly 36 via the control conduit 26. The channel valve assembly 34 is also selectively in fluid communication with the tire 12 via a relief valve assembly 42 and a wheel valve 44.

It should also be noted that the tire inflation system 10 illustrated in FIG. 1 comprises only one channel valve assembly 34. However, in other embodiments (not depicted), the tire inflation system may include a plurality of channel valve assemblies. In these embodiments, each channel valve assembly is in fluid communication with the control valve assembly 18, pressure transducer 20, supply valve assembly 30, and deflate valve assembly 36 via the control conduit 26 as described above. Also, each channel valve assembly may be selectively in fluid communication with a tire or a series of tires via a relief valve assembly and one or more wheel valves.

Referring back to FIG. 1, when energized and placed in an energized position by the electronic control portion 22, the channel valve assembly 34 facilitates fluid communication between the control conduit 26 and a channel conduit 46. When the channel valve assembly 34 is in the energized position, the channel conduit 46 is in fluid communication with the control valve assembly 18 via the channel valve assembly 34 and the control conduit 26. The channel conduit 46 is also in fluid communication with the relief valve assembly 42. Thus, when energized, the channel valve assembly 34 enables fluid communication between the control valve assembly 18 and the relief valve assembly 42. When the channel valve assembly 34 is de-energized and placed in a de-energized position, fluid communication between the control conduit 26 and a channel conduit 46, which is attached to and in fluid communication with the relief valve assembly 42 and the channel valve assembly 34, is prohibited. However, when the channel valve assembly 34 is de-energized and in the closed position, the channel conduit 46 is in fluid communication with the first cavity 24 via an opening 48 in the channel valve assembly 34.

The relief valve assembly 42 facilitates the tire inflation system 10 in measuring the tire pressure, increasing the tire pressure, and decreasing the tire pressure. Also, the relief valve assembly 42 decreases an amount of fluid turbulence in the tire inflation system 10, provides greater flexibility in configuring the tire inflation system 10, and facilitates accurate control of the tire pressure of the tire 12.

The relief valve assembly 42 is in fluid communication with the channel valve assembly 34, the tire 12, and the atmosphere. The relief valve assembly 42 is in fluid communication with the channel valve assembly 34 through the channel conduit 46. The relief valve assembly 42 is in fluid communication with the tire 12 through an outlet conduit 50 and the wheel valve 44. The relief valve assembly 42 is in fluid communication with the atmosphere through an exhaust conduit 52. When the channel valve assembly 34 is de-energized, the exhaust conduit 52 is in fluid communication with the first cavity 24 via the channel valve assembly 34, channel conduit 46, and relief valve assembly 42.

The pressurized air supply 32 is utilized to open the wheel valve 44. The wheel valve 44 is movable from an open position to a closed position and vice versa. The wheel valve 44 allows the tire 12 to selectively communicate with the tire inflation system 10 via the outlet conduit 50.

The electronic control portion 22 communicates with the control valve assembly 18, pressure transducer 20, supply valve assembly 30, channel valve assembly 34, and deflate valve assembly 36. The electronic control portion 22 operates the tire inflation system 10 in response to a set of predetermined instructions, which may also be referred to as software, or in response to an instruction from an operator of the vehicle. The electronic control portion 22 may receive input signals from the pressure transducer 20, a power supply (not depicted) and one or more additional sensors (not depicted) such as, for example, a load sensor and a speed sensor. The electronic control portion 22 may also receive input signals from an operator control device (not depicted). The electronic control portion 22 may include a microprocessor (not depicted) and a non-transitory memory (not depicted) in which programming instructions are stored. The memory can also store identification codes, tire pressure records and/or user inputs over a period of time.

The electronic control portion 22 outputs signals to the valve assemblies 18, 30, 34, 36. The output signals may be electrical current. Electrical current can be received by a selected valve assembly 18, 30, 34, 36 to energize the valve assembly and place the valve assembly 18, 30, 34, 36 into an energized position. Similarly, electrical current can be removed from a valve assembly 18, 30, 34, 36 to de-energize the valve assembly and place the valve assembly 18, 30, 34, 36 into a de-energized position. The electronic control portion 22 may also output signals to a display device (not depicted). The display device may be included as a part of the operator control device or a freestanding device.

The pressure transducer 20 is in fluid communication with and monitors a fluid pressure within the control conduit 26. The pressure transducer 20 is also configured to communicate a signal relaying information about the fluid pressure within the control conduit 26 to the electronic control portion 22.

When the control valve assembly 18 is energized, the pressurized air supply 32 is in fluid communication with the control conduit 26. When the control valve assembly 18 is de-energized, the control conduit 26 is in fluid communication with the first cavity 24 via an opening 54 in the control valve assembly 18. In certain embodiments when the control valve assembly 18 is energized, the control valve assembly 18 is utilized to introduce a bleed of air from the pressurized air supply 32 into the control conduit 26. When the control valve assembly 18 is placed in an energized position by the electronic control portion 22, the bleed of air is introduced into the control conduit 26. Thus, the control valve assembly 18 facilitates fluid communication between the pressurized air supply 32 and the control conduit 26. When de-energized, the control valve assembly 18 facilitates fluid communication between the control conduit 26 and the first cavity 24. In this embodiment, pressurized air in the control conduit 26 can be directed through the control valve assembly 18 and into the first cavity 24.

Before the vehicle fords a body of water, a fording mode can be selected for the tire inflation system 10. The fording mode can be selected by a vehicle operator or another party. Selecting a fording mode, activates a fording protocol. After selecting the fording mode, the pressure in the first cavity is measured. Preferably, the pressure in the first cavity 24 is equal to atmospheric pressure. However, under certain conditions, such as, for example, when the vehicle is fording a body of water, the pressure in the first cavity 24 will be greater than atmospheric pressure.

Before measuring the pressure of the air in the first cavity, one or more pulses of air are directed to the first cavity 24. Preferably, two pulses of air are directed to the first cavity 24. Each pulse of air can be provided by directing pressurized air to the control conduit 26. Preferably, pressurized air is directed to the control conduit by energizing the control valve assembly 18. Energizing the control valve assembly 18 enables fluid communication between the pressurized air supply 32 and the control conduit 26. To provide a pulse of air, it is preferred that pressurized air is directed to the control conduit 26 until the control conduit 26 reaches a predetermined pressure. In other embodiments, the control valve assembly 18 can be energized for a predetermined time to direct pressurized air to the control conduit 26. For example, the control valve assembly 18 can be energized for 10 seconds. However, in other embodiments, the control valve assembly 18 can be energized for another predetermined period of time.

In an embodiment, the predetermined pressure is 25-50 psi. Preferably, the predetermined pressure is about 40 psi. To determine if the control conduit 26 has reached the predetermined pressure, the pressure in the control conduit 26 can be measured by the pressure transducer 20. Once the air in the control conduit 26 is at the predetermined pressure, the control valve assembly 18 is de-energized. When the control valve assembly is de-energized, fluid communication between the control conduit 26 and the pressurized air supply 32 is prevented. However, de-energizing the control valve assembly 18 enables fluid communication between the control conduit 26 and the first cavity 24. Once the control valve assembly is de-energized, the pressurized air in the control conduit 26 can be directed to the first cavity 24 via the opening 54 in the control valve assembly 18. It should be noted that when providing one or more pulses of air to the first cavity 24, it is preferred that the supply valve assembly 30, deflate valve assembly 36, and channel valve assembly 34 are each de-energized.

After directing the one or more pulses of air to the first cavity 24, the pressure of the air in the first cavity 24 is measured. When the vehicle is fording a body of water, the one or more pulses of air directed to the first cavity 24 will increase the pressure in the first cavity 24. Preferably, the one or more pulses of air increase the pressure in the first cavity 24 at least 0.1 psi above a recorded atmospheric pressure.

Preferably, atmospheric pressure is measured periodically by the tire inflation system 10. For example, in an embodiment, atmospheric pressure may be measured every 15 minutes. After measuring the atmospheric pressure, the pressure measured is recorded. The atmospheric pressure can be measured utilizing the pressure transducer 20. The pressure transducer 20 is in fluid communication with the atmosphere via the control conduit 26, control valve assembly 18, first cavity 24, and the exhaust conduit 52 and/or a vent conduit 56. It should be noted that in order to measure the atmospheric pressure, the control valve assembly 18 is de-energized so that the control conduit 26 is in fluid communication with the first cavity 24.

As noted above, after directing one or more pulses of air to the first cavity 24, the pressure of the air in the first cavity 24 is measured. In order to measure the pressure in the first cavity 24, the control valve assembly 18 is de-energized so that the control conduit 26 is in fluid communication with the first cavity 24. When the control valve assembly 18 is de-energized, the pressure transducer 20 can measure the pressure of the air in the first cavity 24 via the control conduit 26 and the control valve assembly 18.

After measuring the pressure of the air in the first cavity 24, it is determined if the pressure in the first cavity 24 is greater than the recorded atmospheric pressure. When the vehicle is fording, the pressure in the first cavity 24 increases above atmospheric pressure. For example, in certain embodiments, the pressure in the first cavity 24 may be 0.1-1.6 psi above atmospheric pressure. However, it should be appreciated that the pressure in the first cavity 24 may be another amount above atmospheric pressure. Thus, if the pressure in the first cavity 24 is greater than the recorded atmospheric pressure, then it is assumed that the vehicle is fording. When the vehicle is not fording, the pressure of the first cavity 24 may be equal to the recorded atmospheric pressure. In this embodiment, the pressurized air from the one or more pulses of air does not increase the pressure of the first cavity 24 because the pressurized air escapes to the atmosphere via the exhaust conduit 52 and/or the vent conduit 56.

Unfortunately, when the vehicle is fording, water may attempt to enter the housing 16 via the exhaust conduit 52 or the vent conduit 56. Advantageously, pressurized air from the one or more pulses of air can pressurize the first cavity 24, exhaust conduit 52, and vent conduit 56 to prevent or reduce water ingress into the first cavity 24 through the exhaust conduit 52 or the vent conduit 56. Preferably, the pressure of the air in the first cavity 24 is equal to the head pressure of the water attempting to enter the housing 14. It should be appreciated that when the pressure of the air in the first cavity 24 is equal to the head pressure of the water attempting to enter the housing 14, the interface between the water and the air in the exhaust conduit 52 or the vent conduit 56 will not change. Therefore, under these conditions, water ingress into the first cavity 24 through the exhaust conduit 52 or the vent conduit 56 is prevented or reduced.

In embodiments where the head pressure of the water increases because, for example, the depth of the water that the vehicle is fording increases, the pressure of the air in the first cavity 24 will increase to be equal to the increased head pressure as additional pressurized air from the one or more pulses of air are added to the first cavity 24. Increases in the pressure of the air in the first cavity 24 when the head pressure of the water increases enable the air to impede the movement of water into the first cavity 24. In embodiments where the pressure in the first cavity 24 is greater than the head pressure of the water attempting to enter the housing 16, the pressure of the air in the first cavity 24 will force any water in the exhaust conduit 52 and the vent conduit 56 out of each conduit 52, 56 and will decrease to be equal to the head pressure of the water.

While the fording protocol is active, additional pulses of air can be provided to the first cavity 24 as described above. Providing additional pulses of air replaces any pressurized air that escapes during fording or adds the pressurized air to the first cavity 24 when the head pressure of the water increases. Additional pulses of air can be provided at predetermined time intervals. For example, a pulse of air can be provided every 15 seconds or at a different interval while the fording protocol is active. Additional pulses of air may continue to be provided even if the vehicle is turned off if the fording protocol was active when the vehicle was turned off.

In certain embodiments where the vehicle has been turned off, the fording protocol may remain active as long as the pressurized air supply is above a predetermined pressure. For example, the fording protocol may remain active as long as the pressurized air supply 32 is at 10 psi or more. Additionally, the fording protocol may remain active as long as the power supply has a voltage that is greater than a predetermined value. For example, the fording protocol may remain active as long as the power supply is at 20 volts or more. To end the fording protocol, the fording mode can be unselected by the vehicle operator or another party. Alternatively, the fording protocol may be terminated when the pressurized air supply is below a predetermined pressure or the power supply has a voltage that is less than a predetermined value.

Figure 2:
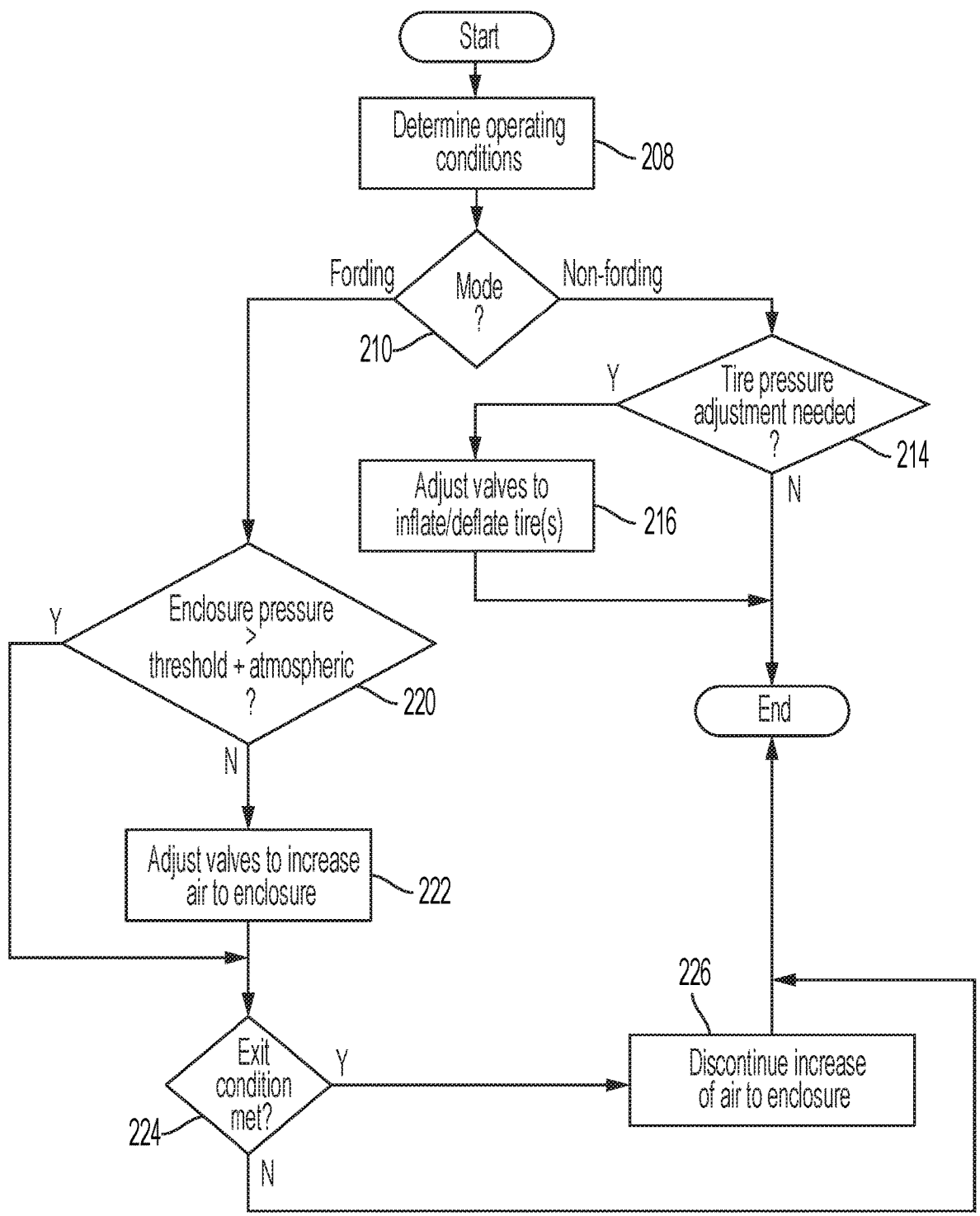
FIG. 2 shows an example routine of instructions that can be stored in memory of a processor of a system controller.

Referring now to FIG. 2, an example routine is described that may be used with the system of FIG. 1. At 208, the routine determines vehicle and/or system operating conditions, which may include updating atmospheric pressure. The operating conditions may include reading the pressure sensor as described with regard to FIG. 1, which in one example may be the only pressure sensor used to determine tire pressures, atmospheric pressure, and whether increased enclosure pressure is detected as described herein. In an example, as described herein with regard to FIG. 2, the system of FIG. 1 may be put into a valve condition where the pressure sensor senses atmospheric pressure (such as all valves deactivated), and a last measured atmospheric pressure may be determined upon selection of fording mode, below, to be used as an atmospheric reference during fording for comparison against the measured enclosure pressure for control of additional air injection into the enclosure to expel water and/or reduce or eliminate water ingress into the enclosure. Further, in an example, the operating conditions determined may include a tire pressure of each tire at the current instant, such as by appropriate control of valve states as described with regard to FIG. 1. The sensed tire pressure may be adjusted based on ambient conditions, such as ambient temperature and/or ambient pressure.

Next, at 210, the routine determines the vehicle operating mode. The mode may be based on current operating conditions, such as GPS navigation, or other sensors indicating whether the vehicle is currently traversing a water feature. In an example, the vehicle operator may select such a mode through a user interface of the vehicle and or a knob or other selector. Further, audio commands from the operator may also be utilized by the system to identify the operating mode of the vehicle. Various modes may be used, such as a fording mode, a non-fording mode, as well as other modes such as off-road, on-road, etc. When a mode is selected that indicates traversal of a water feature, such as fording mode, the routine carries out adjustments that may decrease potential for electronic and/or electromechanical component degradation in a system housing, such as with regard to the tire inflation system as noted herein. The adjustments may include valve adjustments, which may include open/closing one or more of the valves of FIG. 1 and/or adjusting a degree of valve opening in a range that is between fully open and fully closed, including multiple valve openings therebetween. Otherwise, when a non-fording mode is selected, the routine continues to 214.

From 210 in the non-fording mode, the routine continues to carry out automatic tire inflation and/or deflation control. The tire pressure control may adjust the tire pressure system described in FIG. 1 to maintain a desired tire pressure. The desired tire pressure may be set by predetermined values depending on a vehicle mode, which may be set by a user.

Next at 214, the routine determine whether one or more of the monitored tire pressures should be adjusted based on its respective desired tire pressure, as an example. As described with regard to FIG. 1, the system may adjust valves to inflate and/or deflate one or more, or each, tire to its desired pressure at 216. In this operating mode, the valves of the system of FIG. 1 are adjusted to provide desired tire pressure, such as relative to the atmospheric pressure currently sensed at 208. Here, the operation of the tire inflation and/or deflation provides for movement of air through the valve and tubes as described in FIG. 1, such that potential water condensate or other water in the enclosure is cycled out of the system through the tire pressure adjustment operation, without additional air delivery to the enclosure, as compared with the fording mode discussed below.

In this way, before entering fording operation where internal pressure inside the enclosure may increase due to water pressure and water leaking into the enclosure, the system can identify a baseline atmospheric pressure for later comparison (see below).

At 220, during fording operation, the system determines whether pressure in the enclosure is greater than a threshold above atmospheric pressure. The atmospheric pressure may be identified as noted above from a last measured atmospheric pressure before or upon entering fording operation. In an alternative embodiment, atmospheric pressure may be sensed from a vehicle atmospheric pressure sensor or determined from atmospheric pressure data from a navigation system, as an example. The threshold may be a fixed value or may be adjust depending on vehicle operating conditions. In an example, the pressure in the enclosure is determined in the same way atmospheric pressure is measured, but during fording the measurement is determined to indicate enclosure pressure and is compared with the last measured non-fording atmospheric pressure value to detect and reduce/eliminate water ingress.

If the answer to 220 is yes, the routine continues to 222 to adjust the valves to increase enclosure pressure. In an example, a pulse of air is provided after a predetermined time duration until such operation is discontinued, such as when exit conditions are present at 224 and/or the fording mode is ended by user selection of a non-fording mode.

In one example, fixed duration pulses of air may be provided. In an example, monitored conditions may decrease pulse frequency, for example in stages depending on a degree of degradation. The degradation may be indicated via a dropping battery voltage below a threshold, supply pressure dropping below a threshold, termination of engine ignition, etc. The reduced battery voltage may decrease an ability to confirm valve position control. In an example, multiple stages of reduction can be provided, such as first, highest pulse frequency upon entering the fording mode and detecting potential water ingress, then upon battery voltage and/or supply pressure dropping to first thresholds, reducing to a second, lower, pulse frequency and then upon battery voltage and/or supply pressure dropping to second thresholds, reducing to a third, lowest, pulse frequency, and then upon exit conditions stopping the pulsing of air to the enclosure altogether.

Continuing to 224, the exit conditions may include one or more of the first cavity pressure returns to within a threshold of atmospheric pressure, battery voltage of the vehicle battery reaches a lower threshold, a supply pressure falls below a minimum threshold, and/or a user di sables fording operation.

Once exit conditions are met, the routine at 226 discontinues increasing enclosure pressure.

In an example, a method of operating an automatic tire inflation system of a vehicle, comprising: during a non-fording mode, adjusting a valve of the automatic tire inflation system to provide increase or decrease air pressure within a tire of the vehicle; and during as user-selected fording mode, providing one or more pulses of air into a control unit housing space housing valves and electronics of the automatic tire inflation system in response to a cavity pressure of the housing above a threshold. Providing pulses of air into the control unit may include adjusting a valve within the housing and the threshold may be atmospheric pressure.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A method of preventing or reducing water ingress into a tire inflation system, comprising:
    providing a control unit, the control unit having at least one of a valve assembly, a pressure transducer, and an electronic control portion located within a housing;
    measuring a cavity pressure of the housing; and
    if the cavity pressure increases to a predetermined amount above atmospheric pressure, then providing one or more pulses of air into the housing,
    wherein the cavity pressure is compared to a last measured atmospheric pressure before or upon entering a fording operation.

2. The method of claim 1 wherein the tire inflation system utilizes a single pressure sensor to sense tire pressure, atmospheric pressure, and enclosure pressure.

3. The method of claim 1 further comprising operating the tire inflation system to automatically inflate and/or deflate a tire in response to measured tire pressure.

4. The method of claim 1 wherein in response to the comparison, one or more pulses are provided at a first frequency until a degradation is detected.

5. The method of claim 4 wherein the degradation includes a reduced battery voltage.

6. The method of claim 4 wherein the degradation includes a reduced supply pressure.

7. The method of claim 4 wherein the degradation includes a stopped engine ignition.

8. The method of claim 1 wherein valves of the valve assembly are de-energized by default.

9. The method of claim 1 wherein a degree of air provided into the housing is responsive to operating conditions.

10. A method of operating an automatic tire inflation system of a vehicle, comprising:
    during a non-fording mode, and responsive to atmospheric pressure, adjusting a valve of the automatic tire inflation system to measure tire pressure and/or provide an increase or decrease of pressure within a tire of the vehicle; and
    during a user-selected fording mode, providing one or more pulses of air into a cavity of a housing of a control unit, the cavity housing valves and electronics of the automatic tire inflation system, in response to a cavity pressure of the housing being above a threshold relative to atmospheric pressure.

11. The method of claim 10 wherein providing pulses of air into the control unit includes adjusting a valve within the housing.

12. The method of claim 10 further comprising, during the fording mode, decreasing a frequency of pulses in response to a degradation.

13. The method of claim 12 wherein the degradation includes a reduced battery voltage.

14. The method of claim 12 wherein the degradation includes stopped engine ignition.

15. The method of claim 12 wherein the degradation includes a reduced supply pressure.

16. A method of operating an automatic tire inflation system of a vehicle, comprising:
    during a non-fording mode, and responsive to atmospheric pressure, adjusting a valve of the automatic tire inflation system to measure atmospheric pressure and tire pressure with a single pressure sensor, and further to provide an increase or decrease of pressure within a tire of the vehicle responsive thereto; and
    during a user-selected fording mode, measuring enclosure pressure with the sensor and providing one or more pulses of air into a cavity of a housing of a control unit, the cavity housing valves and electronics of the automatic tire inflation system, in response to a comparison of the enclosure pressure relative to the atmospheric pressure measured during the non-fording mode.

17. The method of claim 16 further comprising, during the fording mode, decreasing a frequency of pulses in response to a first degree of degradation.

18. The method of claim 17 further comprising, during the fording mode, further decreasing the frequency of pulses in response to a second, greater, degree of degradation.

* * * * *